W. B. ALLYN.
VARIABLE SPEED APPARATUS.
APPLICATION FILED AUG. 26, 1909.
975,198.
Patented Nov. 8, 1910.
2 SHEETS—SHEET 1.
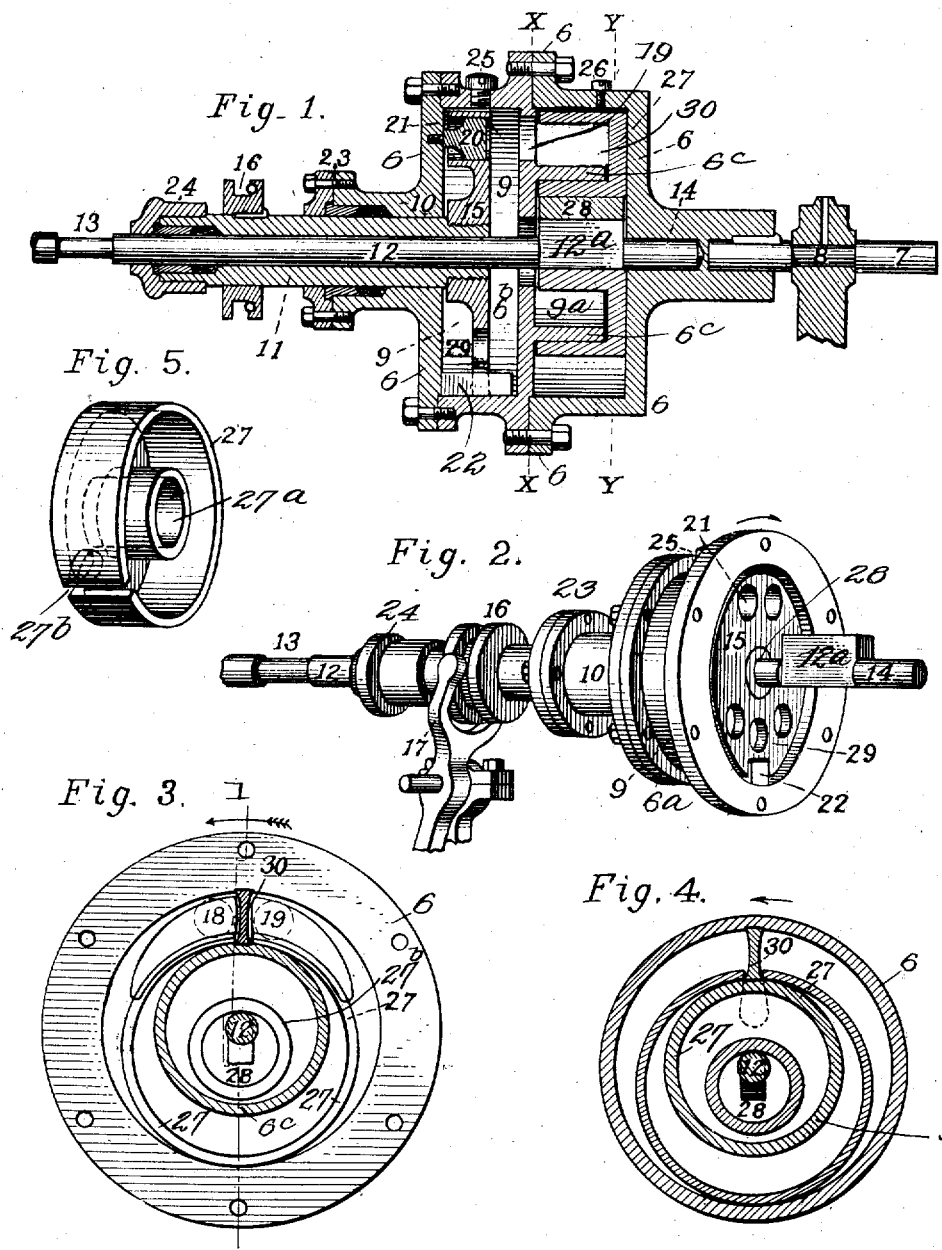
WITNESSES:
INVENTOR
William B. Allyn.

W. B. ALLYN.
VARIABLE SPEED APPARATUS.
APPLICATION FILED AUG. 26, 1909.

975,198.

Patented Nov. 8, 1910.

2 SHEETS—SHEET 2.

WITNESSES:
Samuel E. Wade
Amos W. Hart

INVENTOR
WILLIAM B. ALLYN.
BY Munn & Co.

ATTORNEYS

UNITED STATES PATENT OFFICE.

WILLIAM B. ALLYN, OF WHITESBORO, NEW YORK.

VARIABLE-SPEED APPARATUS.

975,198.   Specification of Letters Patent.   Patented Nov. 8, 1910.

Application filed August 26, 1909. Serial No. 514,826.

*To all whom it may concern:*

Be it known that I, WILLIAM B. ALLYN, a citizen of the United States, and a resident of Whitesboro, in the county of Oneida and State of New York, have invented an Improved Variable-Speed Apparatus, of which the following is a specification.

My invention is a variable speed transmitting apparatus of the hydraulic type, a liquid, such as oil or water, being used as the medium for conveying force or power from the driving to the driven shaft or element. A cylindrical rotatable piston is employed in the rotatable casing, and the same is caused not only to rotate with said casing but to oscillate radially therein, whereby the liquid is caused to circulate; and a valve which is shiftable in the liquid chamber serves as the means for varying the speed of the driven shaft. The driving shaft may, therefore, be run with a constant speed and the speed of the driven one will vary at the will of the operator, that is to say, according to the adjustment of the valve, which is under his control.

The apparatus is particularly adapted for use on motor vehicles and in other places where the load or resistance varies, and is, in fact, applicable in any situation where it is desirable or necessary to vary the speed between the driving and driven medium.

The details of construction, arrangement, and operation of parts embodying the invention are as hereinafter described, and illustrated in the accompanying drawings in which—

Figure 6:
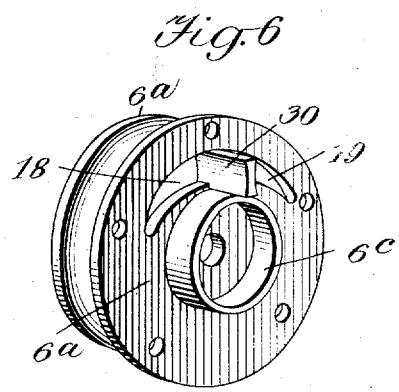
Figure 7:
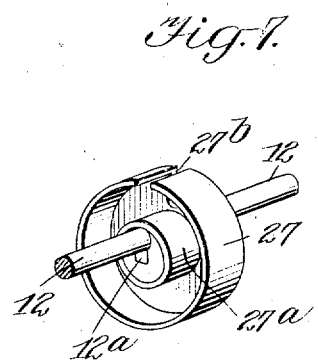
Figure 8:
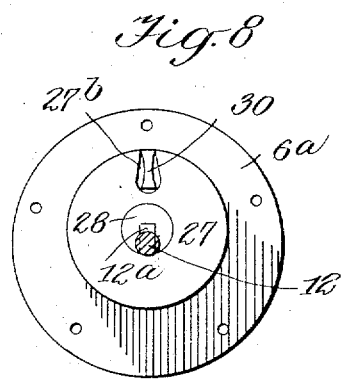
Figure 9:
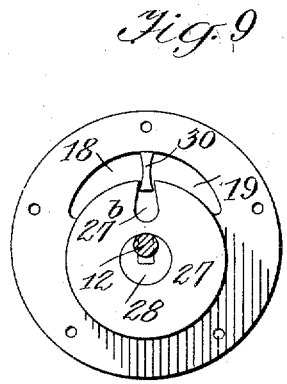
Figure 10:
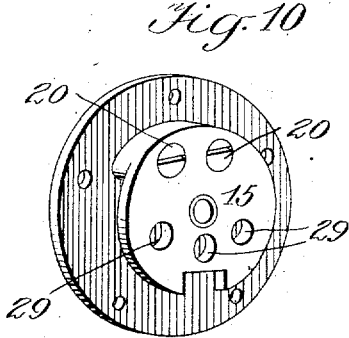
Figure 11:
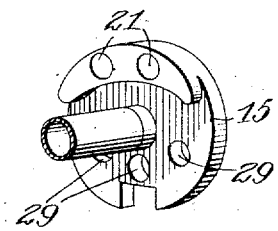

Figure 1 is a longitudinal section of the apparatus on about line 1—1 of Fig. 3. Fig. 2 is a perspective view of a portion of the same. Fig. 3 is a transverse section on the line X—X of Fig. 1. Fig. 4 is a transverse section on the line Y—Y of Fig. 1. Fig. 5 is a perspective view of the rotary oscillating piston. Fig. 6 is a perspective view of the middle member of the casing. Fig. 7 is a perspective view of the cylindrical piston together with the eccentric and driven shaft. Fig. 8 is a face view of the rotary piston, the eccentric, and the middle member of the casing, with the driven shaft in section. Fig. 9 is a similar view, but showing a different position of the piston and eccentric. Fig. 10 is a perspective view of the valve and the adjacent end portion of the casing. Fig. 11 is a perspective view of the valve.

Referring particularly to Fig. 1, the numeral 7 indicates a driving-shaft journaled at 8 in a stationary bearing, and which, in practice, is connected with a motor or any suitable source of power. Its inner end is keyed in the hub of a cylindrical casing. 12 is the driven shaft, which is alined with driver 7 and has at 13 a bearing in some fixed support, and at 14 a bearing in the hub of the casing. The latter is formed of three parts, 6, 6, 6ª, secured together by bolts passing through their parallel, abutting, peripheral flanges, there being a hub extension on each end. One hub end is provided with a stuffing-box 23, in which works a sleeve 11, mounted slidably on the driven shaft 12. The outer end of said sleeve has a stuffing-box 24, and on its inner end is screwed a disk valve 15, which is within the chamber 9 of the casing, and whose construction and operation will be presently described in detail. It is apparent that, by sliding the sleeve 11 either way, the valve 15 will be moved correspondingly, and for this purpose, I employ a pivoted hand lever 17, whose fork engages a grooved collar 16 keyed on the sleeve, as shown in Fig. 1. The middle casing member 6ª has a diaphragm or partition 6ᵇ which is provided with two ports 18 and 19, located adjacently and near the periphery—see Figs. 1, 3, 6. The valve 15 may be adjusted toward or from or against this partition 6ᵇ, to open or close the ports 18, 19, and the valve and the sleeve 11 are caused to rotate with the entire casing by reason of the sliding engagement of the valve with a lug 22—see Figs. 1, 2, 6—said lug being formed integrally with the casing member 6ª, and the valve having a peripheral notch to receive the lug. On the right-hand side, Figs. 1 and 6, the partition 6ᵇ has a circular concentric flange 6ᶜ, which projects into the chamber 9ª, wherein the rotatable cylindrical piston 27 is located. The portion of the driven shaft 12 which traverses the pump chamber 9ª is squared at 12ª, and on such part sits an eccentric 28—see Figs. 1, 7, 8, 9. The cylindrical piston 27 has a notched periphery and a cylindrical concentric flange or hub 27ª that receives the said eccentric 28. The notch or radial slot 27ᵇ in the piston receives a narrow radial abutment 30—see Figs. 3, 4—which forms an integral part of partition 6ᵇ and separates ports 18 and 19. This abutment obviously carries the cylindrical piston 27 around with it when the shaft 7 and casing 6, 6ª, rotate, and the rotation of the driven shaft 12, will, through the medium of the eccentric 28, also cause the piston 27 to have a sliding radial movement in chamber 9ª, with the effect to be presently described. The valve 15 is thickened on one side and provided with transverse openings 21 to receive fixed pistons 20 that may be constructed as screws attached to the left end of the casing 6 and projecting into chamber 9—see Figs. 1, 10, 11. The portion of the valve 15 on the opposite side of the shaft 12 has openings 29—see Figs. 1 and 2—which permit passage of liquid. Water, oil, or other liquid employed is supplied to the chambers 9, 9ª, through an opening in the casing member 6ª, which is closed by screw plug 25, and an air-vent is similarly provided with a plug 26.

The operation of the apparatus is as follows. Power is applied to the driving shaft 7 by means of any suitable prime mover, and this shaft being keyed to the hub of the casing, as already described, the entire casing, together with the valve 15 and its sleeve 11, is rotated. The piston 27 is likewise rotated with the casing but it has another movement due to the eccentric; that is to say, it oscillates and slides radially in the pump chamber 9ª. When the valve 15 is open, that is to say, adjusted in the position shown in Fig. 1, the rotation of the casing has no effect on the driven shaft 12, which remains stationary. In other words, the rotation of the casing with the valve open as shown causes the liquid in the chambers 9 and 9ª to circulate in what may be termed a closed circuit, it passing from one chamber 9 through the port 19 into the pump chamber 9ª, and then back through port 18 into the valve chamber 9. On the other hand, when the valve 15 is adjusted into contact with the partition 6ᵇ, the ports 18 and 19 are closed by it, and the circulation of the liquid is consequently prevented, the portion within the pump chamber 9ª being thus confined so that what may be termed a liquid lock is formed by which the piston 27 is held practically stationary and consequently the driven shaft 12 is rotated with the casing. It will be understood that the latter is driven at a constant speed and that when the valve is adjusted to close the ports 18 and 19, the driven shaft has the same speed; but if the valve be opened more or less, the speed of rotation of the driven shaft 12 will decrease correspondingly. It is thus within the power of the operator to regulate the speed of the driven shaft 12 by adjusting the valve toward or from the ports 18 and 19 by means of the lever 17.

To state the operation in another way, it may be said that a partial closing of the ports 18 and 19 by means of the valve 15 will impede the circulation of the liquid and vary the pressure on the piston 27 and consequently the effect of the latter on the driven shaft 12 through the medium of the eccentric 28 will vary correspondingly and the speed of the driven shaft will, therefore, be changed according to the pressure in the pump chamber 9ª. The operation of the piston thus practically converts the apparatus into a pump, liquid being taken in through one port and discharged through the other, owing to the revolution and sliding movement of the piston. To use an ordinary phrase, the liquid is sucked into the chamber 9ª through one port and is forced out through the other; and when the valve is adjusted to close the ports, there is no pumping action or circulation of the liquid and the piston being thus practically rocked with the casing, it carries the eccentric 28 around with it, and consequently the shaft 12 is driven at the same speed.

It will be understood that the shaft 7 may be driven in either direction; in other words, the apparatus may be reversed without change of effect.

The openings 29 in the valve 15 before referred to have no function except to allow a free passage of the oil, water or other liquid employed in the casing, and this obviously permits the valve to be opened or closed more easily.

The pistons 20, before referred to and which work in holes 21 in the thickened side of the valve, serve to relieve to a greater or less degree the pressure of the liquid on the valve when it is being closed. In other words, these pistons 20 assist in balancing the pressure on the valve. The number may be varied, but two cover enough of the ports 18 and 19 for practical purposes. It is apparent that as the valve slides toward the ports 18 and 19, the pistons 20 remaining stationary, cavities or chambers are thus opened in the valve which obviously serves to relieve the greater part of the pressure on the valve when the liquid is discharged through one of the ports. In brief, instead of the water discharging entirely against the face of the valve, it discharges to a considerable extent against the faces of the pistons which relieves the pressure that much.

The sides of the abutment 30 are made concaved and the inner portion of the slot 27ᵇ in the piston 27 is also enlarged in order to facilitate the oscillating or sliding movement of the piston on the abutment.

What I claim is:—

1. In a variable speed apparatus, an oscillating rotative pumping device comprising a driving element, a driven element, a valve chamber consisting of a structure which is suitably connected with the casing of said pumping device, having a bearing on a rotatable and slidably mounted sleeve, ports for the passage of liquid to and from said valve chamber and pump, means for filling said valve chamber and pump casing with a liquid, and suitable stuffing boxes to prevent undue leakage of liquid, substantially as described.

2. In a variable speed apparatus, an oscillating rotative pumping device comprising a driving element, a driven element, a disk valve mounted on or forming part of a sleeve which is rotatably and slidably mounted on a coöperating driven shaft, means to cause said valve to rotate in unison with the casing, means for imparting axial movement to said valve adapted to simultaneously open or close coöperating ports in the valve chamber for controlling the passage of liquid to and from said chamber and pump, and means for reducing pressure on said valve at the aforesaid ports, substantially as described.

3. A variable speed apparatus, comprising a driving shaft, and a cylindrical casing keyed thereon and having a transverse partition provided with ports, a valve which is slidable within the casing toward and from said partition, for closing the ports more or less, a driven shaft passing through the casing and an eccentric on said shaft, and a cylindrical piston mounted on said eccentric and made of less diameter than the casing chamber, and a device for guiding the piston and causing it to rotate with the casing, substantially as described.

4. In a variable speed apparatus of the character herein referred to, an oscillating rotative pump device comprising a driving element consisting of a cylindrical casing having an annular chamber with passages for the ingress and egress of liquid to and from said chamber, and a fixed abutment interposed between the aforesaid passages, a driven element consisting of a hollow slotted cylindrical piston, an eccentric on which said piston is mounted, and a driven shaft carrying the eccentric, substantially as described.

WILLIAM B. ALLYN.

Witnesses:
E. C. BAKER,
D. H. COLEGROVE.